United States Patent
Rich et al.

(10) Patent No.: US 11,361,601 B2
(45) Date of Patent: Jun. 14, 2022

(54) KIOSK BASED VEHICLE DIAGNOSTIC SYSTEM

(71) Applicant: Innova Electronics Corporation, Irvine, CA (US)

(72) Inventors: David Rich, Huntington Beach, CA (US); Kim Nguyen, Chino, CA (US); Nicholas Ruiz, Huntington Beach, CA (US); Mike Berkaw, Prescott, AZ (US)

(73) Assignee: Innova Electronics Corporation, Irvine, CA (US)

( * ) Notice: Subject to any disclaimer, the term of this patent is extended or adjusted under 35 U.S.C. 154(b) by 170 days.

(21) Appl. No.: 16/812,909

(22) Filed: Mar. 9, 2020

(65) Prior Publication Data

US 2021/0279978 A1    Sep. 9, 2021

(51) Int. Cl.
*G07C 5/08* (2006.01)
*G06K 19/06* (2006.01)
(Continued)

(52) U.S. Cl.
CPC ......... *G07C 5/0808* (2013.01); *G06K 7/1095* (2013.01); *G06K 7/1417* (2013.01); *G06K 19/06037* (2013.01); *G06K 19/06112* (2013.01); *G07C 5/006* (2013.01); *G07C 5/008* (2013.01); *G07C 5/085* (2013.01); *G07C 5/0825* (2013.01); *H04L 63/0428* (2013.01); *H04L 67/12* (2013.01); *H04N 7/183* (2013.01);
(Continued)

(58) Field of Classification Search
None
See application file for complete search history.

(56) References Cited

U.S. PATENT DOCUMENTS

D334,560 S    4/1993  Wilson
5,884,202 A   3/1999  Arjomand
(Continued)

OTHER PUBLICATIONS

U.S. Department of Transportation-National Highway Traffic Safety Administration (Daniel C. Smith) Federal Motor Vehicle Safety Standards: Vehicle-to-Vehicle (V2V) Communications, Aug. 20, 2014, 9 pages, Federal Register vol. 79, No. 161, Washington, D.C.
(Continued)

*Primary Examiner* — Kristy A Haupt
(74) *Attorney, Agent, or Firm* — Stetina Brunda Garred and Brucker; Mark B. Garred

(57) ABSTRACT

A vehicle diagnostic includes a kiosk a display configured to depict a visual code thereon, with the visual code being readable by a handheld communication device and associated a unique electronic identifier. The kiosk additionally includes a diagnostic tool connectable to a vehicle to retrieve vehicle data therefrom. A remote server is in communication with the kiosk and is disposable in communication with the handheld communication device. The server is capable of: receiving a signal from the handheld communication device including the unique electronic identifier; receiving a signal from the kiosk including the vehicle data; analyzing the vehicle data to determine a diagnostic solution; and storing the diagnostic solution such that the diagnostic solution is retrievable in response to receipt of a subsequent signal including the unique electronic identifier.

27 Claims, 4 Drawing Sheets

(51) Int. Cl.
*G07C 5/00* (2006.01)
*G06K 7/14* (2006.01)
*G06K 7/10* (2006.01)
*H04N 7/18* (2006.01)
*H04L 67/12* (2022.01)
*H04L 9/40* (2022.01)
*G06Q 10/08* (2012.01)
*G06Q 20/18* (2012.01)
*G06Q 10/00* (2012.01)

(52) U.S. Cl.
CPC ........... *G06Q 10/087* (2013.01); *G06Q 10/20* (2013.01); *G06Q 20/18* (2013.01)

(56) References Cited

U.S. PATENT DOCUMENTS

| | | | |
|---|---|---|---|
| 6,055,468 | A | 4/2000 | Kaman et al. |
| D510,287 | S | 10/2005 | Chen et al. |
| D545,223 | S | 6/2007 | Chen |
| D559,137 | S | 1/2008 | Protti |
| D560,129 | S | 1/2008 | Rich et al. |
| D560,527 | S | 1/2008 | Rich et al. |
| D563,249 | S | 3/2008 | Chen |
| D569,280 | S | 5/2008 | Chen |
| D571,241 | S | 6/2008 | Andreasen et al. |
| D581,822 | S | 12/2008 | Madison et al. |
| D588,621 | S | 3/2009 | Baty |
| D590,387 | S | 4/2009 | Chen |
| D610,586 | S | 2/2010 | Chen |
| D624,446 | S | 9/2010 | Chen et al. |
| D624,838 | S | 10/2010 | Chen et al. |
| D625,209 | S | 10/2010 | Chen et al. |
| D625,210 | S | 10/2010 | Chen et al. |
| D625,634 | S | 10/2010 | Chen et al. |
| D646,188 | S | 10/2011 | Chen et al. |
| D646,599 | S | 10/2011 | Chen et al. |
| 8,600,610 | B2 | 12/2013 | Bertosa et al. |
| 8,811,008 | B2 | 8/2014 | Selkirk et al. |
| 8,892,271 | B2 | 11/2014 | Breed |
| 9,183,681 | B2 | 11/2015 | Fish |
| D745,029 | S | 12/2015 | Gray et al. |
| D746,316 | S | 12/2015 | Gray et al. |
| D746,323 | S | 12/2015 | Gray et al. |
| 9,213,332 | B2 | 12/2015 | Fish et al. |
| D747,734 | S | 1/2016 | Gray et al. |
| D749,623 | S | 2/2016 | Gray et al. |
| 9,262,254 | B2 | 2/2016 | Bertosa et al. |
| 9,292,977 | B2 | 3/2016 | Bertosa et al. |
| D757,059 | S | 5/2016 | Gray et al. |
| 9,329,633 | B2 | 5/2016 | Selkirk et al. |
| D770,462 | S | 11/2016 | Gray et al. |
| 9,858,731 | B2 | 1/2018 | Fish et al. |
| 9,904,634 | B2 | 2/2018 | Case, Jr. et al. |
| 10,295,333 | B2 | 5/2019 | Fish et al. |
| 10,467,906 | B2 | 11/2019 | Fish et al. |
| 2005/0182537 | A1* | 8/2005 | Tefft ................... G06Q 20/18 701/29.6 |
| 2005/0273218 | A1 | 12/2005 | Breed et al. |
| 2007/0038338 | A1 | 2/2007 | Larschan et al. |
| 2009/0248222 | A1 | 10/2009 | McGarry et al. |
| 2010/0204876 | A1* | 8/2010 | Comeau ................ G07C 5/008 701/29.6 |
| 2012/0212499 | A1 | 8/2012 | Haddick et al. |
| 2013/0127980 | A1 | 5/2013 | Haddick et al. |
| 2013/0201316 | A1 | 8/2013 | Binder et al. |
| 2014/0032014 | A1 | 1/2014 | DeBiasio et al. |
| 2014/0046508 | A1 | 2/2014 | Himmelstein |
| 2015/0045993 | A1 | 2/2015 | Cooper et al. |
| 2015/0127714 | A1* | 5/2015 | Ivashyn ................. G06F 21/42 709/203 |
| 2015/0206357 | A1 | 7/2015 | Chen et al. |
| 2015/0269788 | A1* | 9/2015 | Elliott .................... G06Q 20/18 701/31.5 |
| 2015/0346718 | A1 | 12/2015 | Stenneth |
| 2016/0046373 | A1 | 2/2016 | Kugelmass |
| 2016/0114745 | A1 | 4/2016 | Ricci |
| 2016/0147223 | A1 | 5/2016 | Edwards et al. |
| 2016/0194014 | A1 | 7/2016 | Rajendran |
| 2017/0186054 | A1 | 6/2017 | Fish et al. |
| 2017/0193716 | A1* | 7/2017 | Wittliff, III ........... B60L 53/305 |
| 2017/0267192 | A1 | 9/2017 | Chen |
| 2018/0081857 | A9* | 3/2018 | Chen .................... G07C 5/0808 |
| 2018/0101775 | A1 | 4/2018 | Fish |
| 2018/0137693 | A1 | 5/2018 | Raman |

OTHER PUBLICATIONS

Babcox Media, Inc., Telematics Talk WEX Awarded Homeland Security Purchase Agreement for Telematics Products and Services, Aug. 25, 2017.

SAE International, SAE Vehicle Interface Methodology Standard Proposal-Status Report Dec. 2015 SC31 Meeting in Auburn Hills, MI, Sep. 22, 2016, 11 pages, www.sae.org.

SAE International, Surface Vehicle Standard J2735, Dedicated Short Range Communications (DSRC) Message Set Dictionary, Mar. 2016, 267 pages, www.sae.org.

SAE International, Surface Vehicle Standard J2945/1, On-Board System Requirements for V2V Safety Communications, Mar. 2016, 127 pages, www.sae.org.

U.S. Department of Transportation-National Highway Traffic Safety Administration, NHTSA Issues Notice of Proposed Rulemakaking and Research Report on Vehicle-to-Vehicle Communications, Vehicle-to-Vehicle Communication Technology, Dec. 13, 2016, 4 pages, vol. 1, https://icsw.nhtsa.gov/safercar/v2v/pdf/V2V_NPRM_Fact_Sheet_121316_v1.pdf.

* cited by examiner

KIOSK BASED VEHICLE DIAGNOSTIC SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure generally relates to a vehicle diagnostic system, and more specifically, to a kiosk-based or computer tablet-based vehicle diagnostic system capable of utilizing the capabilities of a user's handheld communication device as a user interface.

2. Description of the Related Art

Modern vehicles include a network of electronic systems and control modules, which may be associated with several different aspects of the vehicle, such as the powertrain, braking, steering, suspension, climate control, lighting, entertainment, communications, or navigation. A network scan may refer to the process of communicating with the various control units or modules on a particular vehicle to identify any faults that may be present or to identify the status of the various modules. Network scans may also be an integral component of safety inspections, particularly in relation to advanced driver-assistance systems (ADAS). A network scan may be completed by a scan tool designed to interface with the vehicle via a diagnostic port on the vehicle.

Scan tools may be a significant resource for mechanics or vehicle enthusiasts who enjoy maintaining their own vehicle, as the scan tool may allow the mechanic or vehicle owner to access the vehicle data and analyze the data to identify a possible diagnosis as to what may be wrong with the vehicle. Once a diagnosis has been identified, the vehicle professional or auto enthusiast may obtain any necessary repair parts and perform any related repair services associated with a likely fix.

While a scan tool may provide access to useful diagnostic information for a vehicle professional or vehicle enthusiast, many vehicle owners may not own a scan tool, and thus, may not be able to easily diagnose a vehicle. Furthermore, many vehicle owners may be intimidated by vehicle diagnostic equipment due to possible personal inexperience in vehicle maintenance and repair. Consequently, the idea of using a scan tool may be overwhelming to many vehicle owners, and thus many vehicle owners may forego regular review of diagnostic data on a vehicle. When left unattended, minor diagnostic issues may evolve into major diagnostic issues associate with greater cost. Thus, in most cases, it is in the best interest of the vehicle owner to regularly retrieve and review diagnostic data from the vehicle.

Vehicle parts stores and repair shops may also have an interest in their customers having a more regular retrieval and review of diagnostic data. It is likely that vehicle owners would become more frequent customers of vehicle parts stores and repair shops to address minor diagnostic issues identified during a review of diagnostic data.

Moreover, vehicle parts stores and repair shops may also have an interest in being involved in the customer's retrieval of diagnostic data and the diagnostic analysis of such data. In this regard, vehicle parts stores and repair shops may be able to more seamlessly generate sales associated with the customer's vehicle diagnosis if they are involved in the diagnostic process. However, there may be logistical complications associated with such involvement. For instance, there may be logistical difficulties in obtaining a comprehensive set of information, which may not only include the diagnostic data, but also customer information and vehicle information, which may be required for the vehicle diagnosis, and also for any referrals that may be made based on the diagnosis. Furthermore, even if such information can be obtained, there may be difficulties in organizing the information by customer or by specific transactions, without disrupting or interfering with an already existing computer system in the store or repair shop.

Accordingly, there is a need in the art for a vehicle diagnostic system which may be easily accessible to a vehicle owner and which may utilize hardware that may be familiar to a vehicle owner. There is also a need in the art for such a system which may serve customers of vehicle parts and repair shops and which can easily retrieve data from a vehicle and customer to complete a vehicle diagnosis. Various aspects of the present invention are directed toward addressing these needs, as will be discussed in more detail below.

BRIEF SUMMARY

Various aspects of the present invention are directed toward a kiosk-based vehicle diagnostic system, which may rely on, or be supported by, the capabilities of a handheld communication device, e.g., smartphone, for data input and/or display. The kiosk may include a tool which may be connectable with a port on the vehicle to retrieve data therefrom. The kiosk may display a visual code which may be readable by the smartphone to pair the smartphone with the kiosk to allow vehicle identification information to be entered into the smartphone and uploaded to the kiosk to allow for configuration of the tool for communication with the vehicle. The kiosk may be located at an automotive parts store, an automotive service location, along streets or highways, at shopping centers, in parking lots, or other easily accessible locations for drivers.

According to one embodiment, there is provided a vehicle diagnostic system for use with a handheld communication device. The vehicle diagnostic system includes a kiosk having a housing and a processor disposed within the housing and capable of generating or receiving a signal associated with a visual code. The kiosk additionally includes a display associated with the housing and in communication with the processor to receive the signal. The display is configured to depict the visual code thereon in response to receipt of the signal, with the visual code being readable by the handheld communication device and associated a unique electronic identifier. The kiosk additionally includes a diagnostic tool connected to the housing and connectable to a vehicle to retrieve vehicle data therefrom. The vehicle diagnostic system further comprises a remote server in communication with the kiosk and disposable in communication with the handheld communication device. The remote server may be in communication with the kiosk and the handheld communication device via the Internet, cellular communication networks, or the like. The server is capable of: receiving a signal from the handheld communication device including the unique electronic identifier; receiving a signal from the kiosk including the vehicle data; analyzing the vehicle data to determine a diagnostic solution; and storing the diagnostic solution such that the diagnostic solution is retrievable in response to receipt of a subsequent signal including the unique electronic identifier.

The server may be configured to communicate the diagnostic solution to the handheld communication device for presentation on the handheld communication device. The server may be configured to communicate the diagnostic solution to the kiosk via the Internet, or other communication pathways, for presentation on the display.

The kiosk may include a transceiver in communication with the processor and capable of communicating with the handheld communication device via wired or wireless communication. The kiosk may include a local communications database including a plurality of vehicle protocols correlated with vehicle identification information.

The visual code may be a QR (Quick Response) code, a barcode, an alphanumeric code, universal product code (UPC), tiny url, or other unique visual code.

The vehicle data may include diagnostic trouble codes, and the diagnostic solution may include a most likely fix based on at least one of the diagnostic trouble codes.

According to one embodiment, there is provided a vehicle diagnostic system for use with a handheld communication device. The vehicle diagnostic system includes a kiosk having a housing and a transceiver disposed within the housing and configured to communicate with the handheld communication device. The kiosk additionally includes a processor disposed within the housing and capable of generating a signal including an associated visual code. The kiosk further includes a display associated with the housing and in communication with the processor to receive the signal, with the display being configured to depict the visual code thereon in response to receipt of the signal. The visual code is readable by the handheld communication device and is associated with instructions for configuring the handheld communication device to communicate with the transceiver. The kiosk additionally includes a diagnostic tool in communication with the housing and communicable with a vehicle to retrieve data therefrom. The vehicle diagnostic system further includes computer executable instructions downloadable onto the handheld communication device for configuring the handheld communication device to read the visual code depicted on the display, and establish communication between the handheld communication device and the kiosk to facilitate data transfer between the handheld communication device to kiosk.

The computer executable instructions may further configure the handheld communication device to identify a kiosk communication characteristic associated with the visual code in response to receipt of the visual code. The kiosk communication characteristic may include a communication protocol or may include a communication address.

The computer executable instructions may further configure the handheld communication device to display a prompt to a user to enter vehicle identification information into the handheld communication device.

The computer executable instructions may additionally configure the handheld communication device to utilize an onboard camera to optically obtain vehicle identification information from a vehicle.

The computer executable instructions may further configure the handheld communication device to display diagnostic information associated with the data retrieved by the diagnostic tool. The diagnostic information may include diagnostic trouble codes, or a diagnostic solution associated with the retrieved data.

The computer executable instructions may further configure the handheld communication device to depict content depicted on the display of the kiosk.

The display on the kiosk may be configured to display information associated with the data retrieved by the diagnostic tool.

The visual code may include a QR code or a barcode.

According to another embodiment, there is provided a vehicle diagnostic method comprising the steps of generating a visual code on a kiosk display for scanning by a camera on a handheld communication device. The method additionally includes receiving, at the kiosk, vehicle data retrieved from a vehicle under test. A signal is communicated to a remote server via the Internet or other communication pathways, with the signal including the vehicle data and an identifier associated with the visual code. The vehicle data is analyzed to determine a possible vehicle fix associated with the vehicle data. The method further includes storing the possible vehicle fix on the remote server in a manner which allows for subsequent retrieval of the possible vehicle fix from the remote server in response to receiving the identifier at the remote server.

The method may additionally include the step of transmitting the possible vehicle fix from the remote server to the handheld communication device.

The method may further comprise communicating vehicle data from the handheld communication device to the kiosk, and deriving at least one vehicle communication protocol from the vehicle data.

The method may additionally include the steps of scanning the visual code onto a handheld communication device, acquiring vehicle diagnostic data from the vehicle under test via the handheld communication device, and communicating the vehicle data from the handheld communication device to the kiosk and/or to the remote server.

The generating step may include generating a non-human readable visual code on the kiosk display. The generating step may include generating a QR code on the kiosk display.

The method may also include encrypting the signal prior to sending the signal to the remote server.

The presently contemplated embodiments will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Figure 1:
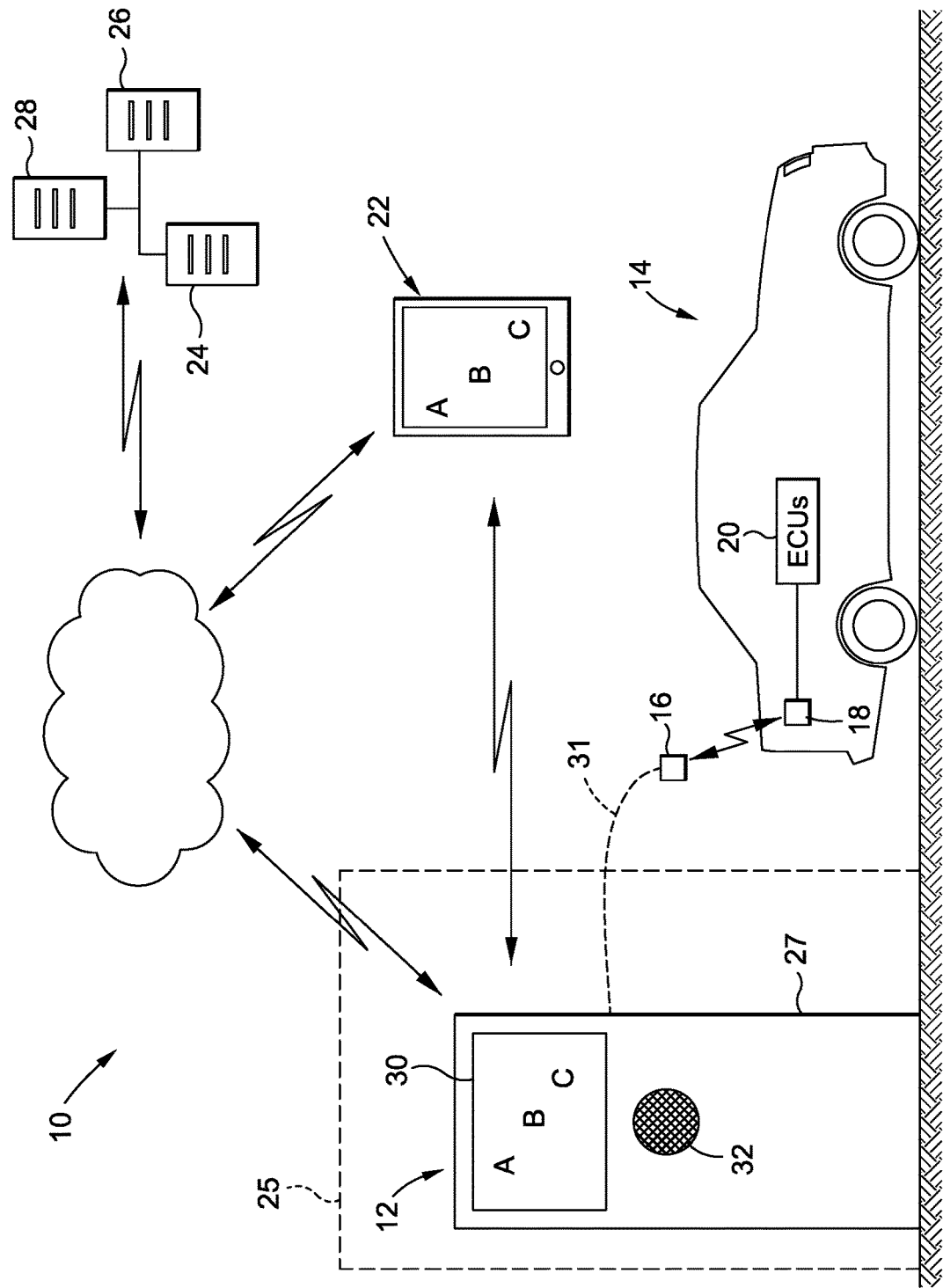
FIG. 1 is a schematic system overview of a kiosk based vehicle diagnostic system.
Figure 2:
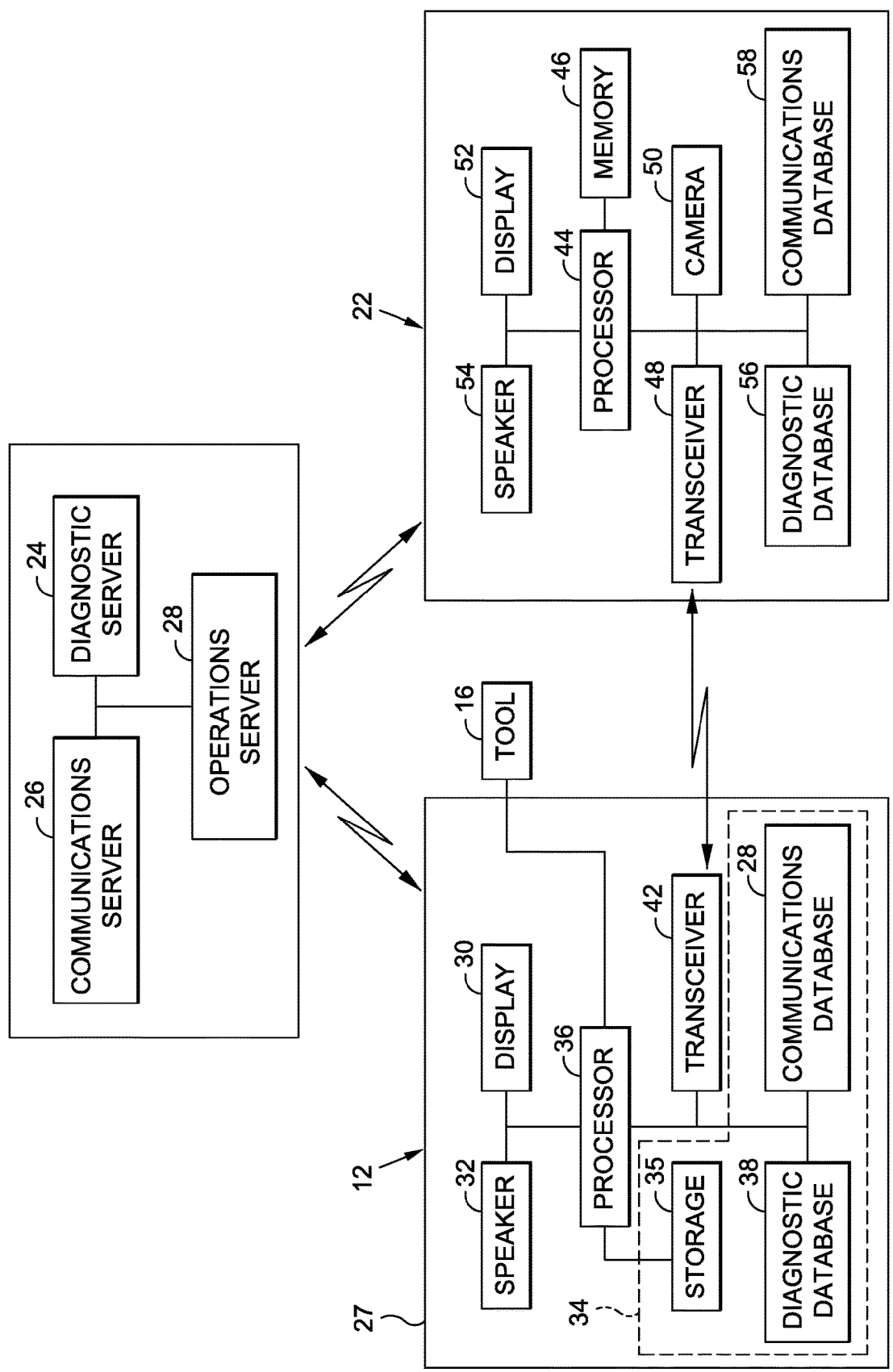
FIG. 2 is a schematic diagram of a kiosk, a handheld communication device and a remote server.

Referring now to the drawings, wherein the drawings are for purposes of illustrating a preferred embodiment of the present invention only, and are not for purposes of limiting the same, there is depicted a vehicle diagnostic system 10 which utilizes a kiosk 12 which may be deployed in a convenient location for retrieving data and information from a vehicle 14 and interfacing with a customer. In this regard, it is contemplated that the kiosk 12 may be deployable at a vehicle parts store, a convenience store, a gas station, a parking lot, or other easily accessible location. The kiosk 12 may include a tool 16 plug connectable into a diagnostic port 18 on the vehicle 14 to communicate with the electrical system on the vehicle 14, i.e., the vehicle ECU 20 for retrieving vehicle data and/or vehicle information. Once the vehicle data and information is obtained, it may be analyzed to produce a diagnostic summary. The customer may be required to interact with the kiosk 12 at various stages of the process to provide information, as well as to receive the diagnostic summer. Accordingly, various aspects of the present disclosure are directed toward utilizing a customer's handheld communication device 22 to facilitate and enhance customer interaction with the kiosk 12. In one embodiment, the customer's handheld communication device 22, e.g., smartphone, may be operatively linked to the kiosk 12 to allow the handheld communication device 22 to serve as a user interface for the kiosk 12. For instance, the smartphone 22 may be used to retrieve vehicle identification information from the vehicle 14 and upload such information to the kiosk 12 or to a remote server 24, 26, 28 operatively associated with the kiosk 12. In this regard, it is contemplated that the smartphone 22 may be used as a "hotspot" (e.g., a location which may provide Internet access) for the kiosk 12. The smartphone 22 may also be used to display diagnostic results subsequent to any retrieval of data from the vehicle 14.

The smartphone 22 may be operatively linked to the kiosk 12 by displaying a unique visual code on the kiosk 12. The visual code may be scanned by the smartphone 22, which may cause the smartphone 22 to send a signal to a remote operations server 28 for creating a record on the remote operations server 28 of the customer's interaction with the kiosk 12. The stored record may be associated with a unique code, which may allow retrieval of any diagnostic data and any results associated with the customer's interaction with the kiosk 12 at any time when the unique code is provided to the server 28. Furthermore, the scanning of the visual code by the smartphone 22 may configure the smartphone 22 to communicate directly with the kiosk 12. As such, any data or information retrieved by the smartphone 22 or entered into the smartphone 22 may be uploaded, or relayed to the kiosk 12 via the Internet, cellular communication network, or communication pathways, and any information displayed on the kiosk 12 may be mirrored on the smartphone 22. Therefore, by interfacing the smartphone 22 with the kiosk 12, data and information may be more easily collected, analyzed and presented to the customer. Furthermore, for customers that may be overwhelmed or intimated by vehicle diagnostics, the ability to use the customer's own smartphone 22 may ease any concerns and allow for a more user-friendly experience.

FIG. 1 is a system level view showing the kiosk 12, the smartphone 22, and a vehicle 14. Both the kiosk 12 and the smartphone 22 are capable of communicating with one or more remote servers, such as a diagnostic server 24, a communications server 26, or operations server 28. The smartphone 22 may have an application ("app") downloaded thereon and which may be used to facilitate communication between the smartphone 22 and the kiosk 12 and/or between the smartphone 22 and the remote servers 24, 26, 28 via the Internet, or cellular communication network, or the like.

The kiosk 12 may include a housing 27 which may be mounted on the ground or an underlying support surface. The kiosk 12 may be positioned inside a store 25 or in a location closer to the vehicle, such as outside in a parking lot. Accordingly, particularly when positioned outside, the housing 27 may be configured to be withstand the natural elements, such as rain, sleet, snow, sunlight, wind, freezing temperatures, etc. The housing 27 may be formed from metal, plastic, wood, or other materials known in the art.

A display 30 may be connected to the housing 27 for displaying information related to operation of the kiosk 12 and a speaker 32 may also be connected to the housing 27 for playing audible signals associated with operation of the kiosk 12. The display 30 may be a touch-screen display or a non-touch screen display.

The kiosk 12 may additionally include a memory 34 and a processor 36 located within the housing 27. The memory 34 may include storage 35 capable of storing operational information, such as operating instructions. The storage 35 may also be capable of short-term data storage, such as buffering data during an interaction with a particular vehicle 14 or customer (e.g., buffering vehicle data, vehicle identification information, handheld device identification information, customer information, etc.).

The memory 34 may additionally include a diagnostic database 38 to allow the kiosk 12 to perform a certain degree of diagnostic analysis locally at the kiosk 12. For instance, the diagnostic database 38 may allow for translation of diagnostic trouble codes (DTC's). More comprehensive diagnostic analysis may be performed using the local database 38, although it is contemplated that the kiosk 12 may rely on a remote diagnostic server 24 for more comprehensive diagnostic analysis, as will be described in more detail below.

The memory 34 may further include a communications database 40, which may be used by the kiosk 12 to facilitate communications to and from the kiosk 12. For instance, the communications database may be used to facilitate communications between the kiosk 12 and a vehicle 14. In this regard, the communications database 40 may include various vehicle communication protocols associated with vehicle identification information. The vehicle communication protocols stored on the communications database 40 may include basic communications protocols, such as SAE J1850 PWM, SAE J1850 VPW, ISO9141-2, ISO14230-4 (KWP2000), and ISO 15765-4/SAE J2480. Additional communication protocols needed to communicate with a specific vehicle system may also be stored on the communications database 40 or may be accessed on a remote communications server 26. The communications database 40 may also include communication protocols or instructions for communicating with one or more handheld devices 22, as well as communicating with remote locations, such as remote servers or databases. In this regard, the communications database 40 may include preprogrammed website addresses that may be visited to access remote resources, such as diagnostic databases or diagnostic analysis tools.

The processor 36 may be configured to execute any operational commands associated with operation of the kiosk 12. In this regard, the processor 36 may be in communication with the various components on the kiosk 12 to facilitate the functioning of the kiosk 12.

The kiosk 12 may also include a transceiver 42 located within, or otherwise coupled to the housing 27, to facilitate both short-range and long-range communications to and from the kiosk 12. In this regard, the transceiver 42 may include both a short-range circuit and a long-range circuit.

The long-range communications may be to or from a remote server such as diagnostic server 24, communications server 26, operations server 28, which may be accessible via the Internet at a specific web address to facilitate the collection and distribution of data and information to a customer. The short-range communications may be between the kiosk 12 and the handheld communication device 22. For instance, the short-range communications may be made via Bluetooth®, WiFi, or other short-range communication technologies known in the art. The kiosk 12 may be associate with a kiosk communication characteristic, such as a unique electronic identification number, and the handheld communication device 22 may be associated with a device communication characteristic, such as a unique electronic identification number, which may be used to facilitate such short-range communications, and to ensure communication is between the kiosk 12 and the handheld communication device 22, and is not with adjacent electronic devices.

The kiosk 12 may additionally include a tool 16 which may be used to retrieve data from a vehicle 14. In this regard, the tool 16 may be similar to a conventional vehicle scan tool. The tool 16 may include a connector that is plug connectable to the diagnostic port 18 on the vehicle 14, such as an OBD-II port. The tool 16 may communicate with an onboard vehicle computer, e.g., electronic control unit (ECU) 20, or other vehicle system, component, sensor, etc., to retrieve data and information therefrom. The tool 16 may also be capable of retrieving vehicle identification information from the vehicle 14. As shown in FIG. 1, the tool 16 may be physically connected to the housing via a connector cable 31, which may be configured to facilitate data and information transfer between the tool 16 and the processor 36 or memory 34 on the kiosk 12. In an alternative embodiment, the tool 16 may be detachable from the housing 27 and may be capable of communicating with the vehicle 14 when detached or separated from the housing 27. This may be particularly advantageous in situations where the housing 27 is located inside a store 25 and the vehicle 14 is located in a parking lot outside of the store 25. In that case, a customer may take the tool 16 from the store 25 and into the parking lot, where the customer's car may be located, to plug the tool 16 into the vehicle 14. Any data and information collected by the tool 16 may be temporarily stored locally on the tool 16 and then transferred to the memory or processor when the tool 16 is returned to the housing 27. A holster or cradle may be connected to the housing 27 for connecting the tool 16 to the housing 27. The holster or cradle may include electrical connections which may engage with corresponding electrical connections on the tool 16 to allow for the transfer of data and information between the tool 16 and the memory 34 and processor 36 when the tool 16 is engaged with the holster or cradle. It is also contemplated that the tool 16 may transfer data and information with the memory 34 and processor 36 via wireless communication. The holster or cradle may be configured to include a locking mechanism to lock the tool 16 in place in connection to the housing 27 during periods of non-use. The locking mechanism may be unlocked in response to the customer placing a credit card into the kiosk, logging into the kiosk system, or otherwise sending an unlock signal associated with an agreement to pay for the diagnostic services.

As noted above, several aspects of the present disclosure relate toward utilizing a handheld communication device 22 during a customer's interaction with the kiosk 12. The handheld communication device 22 may include a processor 44, a memory 46, a transceiver 48, a camera 50, a display 52, and a speaker 54. In addition, an application may be downloaded onto the smartphone 22, which may include a diagnostic database 56, and a communications database 58, as will be described in more detail below. The application may additionally include instructions for configuring the smartphone 22 to communicate with the kiosk 12 and one or more remote servers 24, 26, 28 associated with operation of the kiosk 12.

Operative Link Between Handheld communication device and Kiosk

Figure 3:
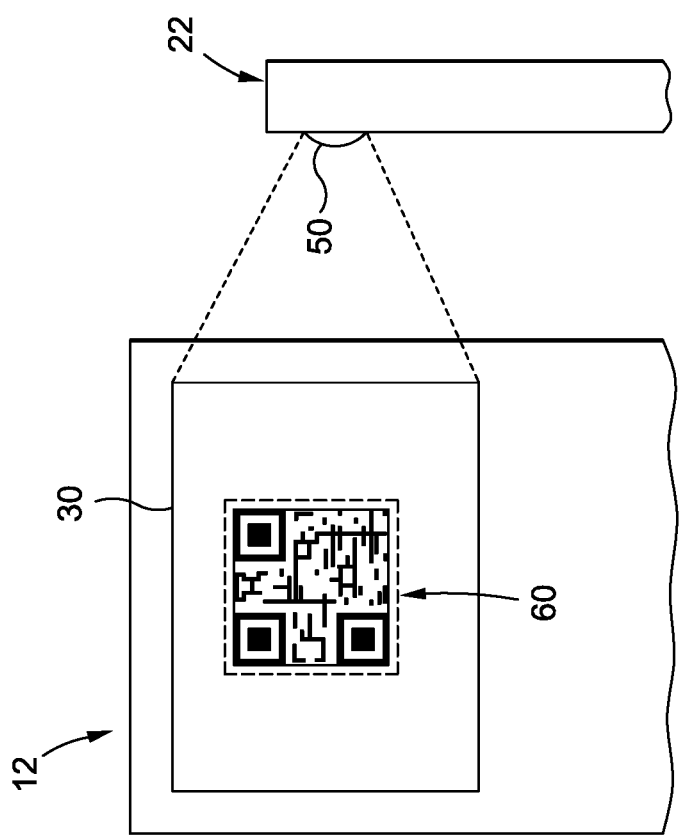
FIG. 3 is a schematic view of a handheld communication device scanning a QR code depicted on a kiosk.
Figure 4:
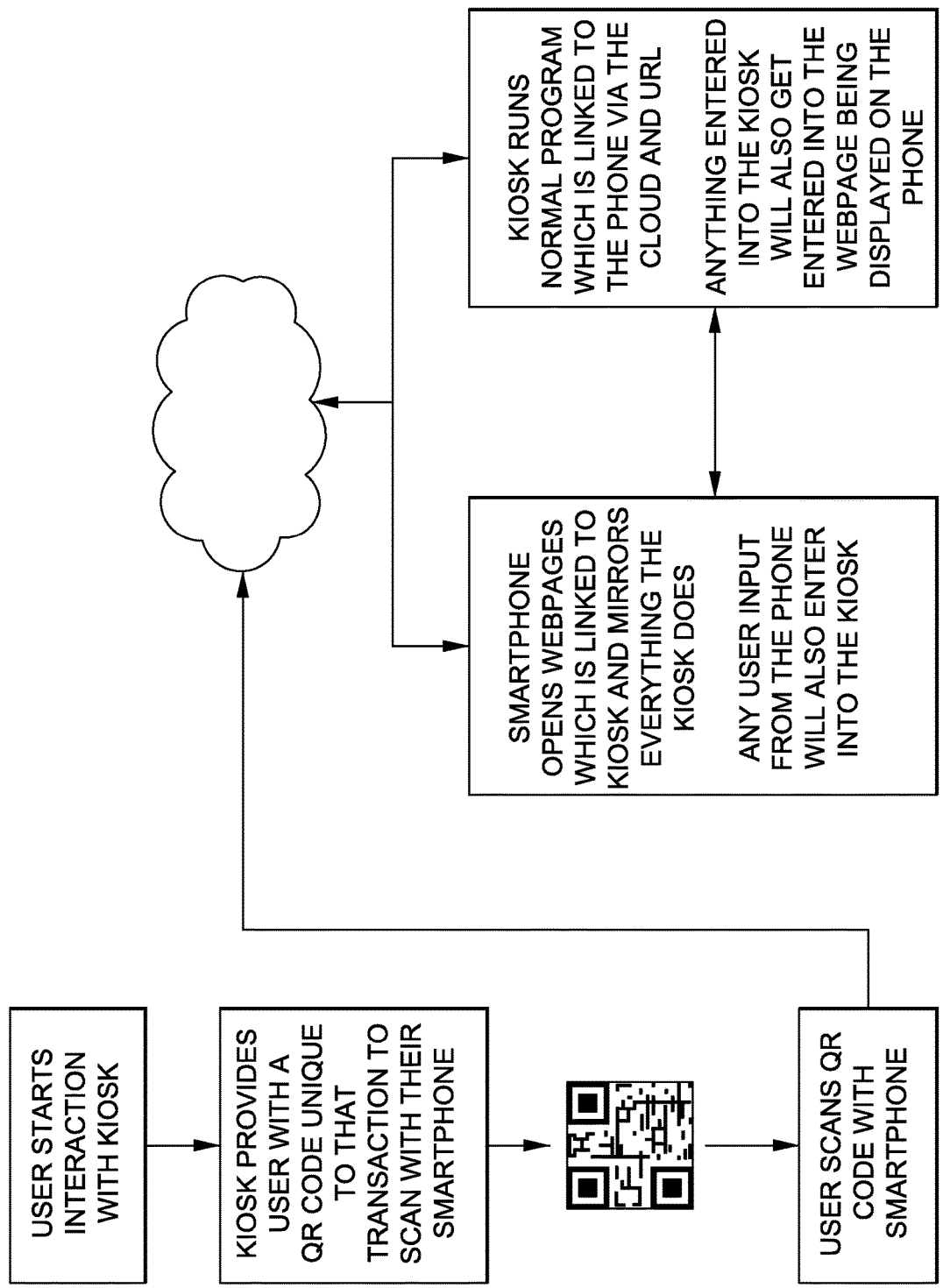
FIG. 4 is a flow chart of an exemplary use of the kiosk based vehicle diagnostic system.

Referring now to FIG. 3, the handheld communication device 22 may be operatively linked to the kiosk 12 by displaying a visual code 60 on the kiosk 12 which may be captured, scanned, or otherwise recognized by the handheld communication device 22. The visual code 60 may be depicted on the kiosk display 30 in response to the customer activating an initiation button on the kiosk 12 or by the kiosk 12 detecting the presence of the customer in front of the kiosk 12. The visual code 60 may include a unique QR code, barcode, alphanumeric code, icon, visual pattern, etc., that may be scanned, captured, or otherwise optically identified through the use of the camera 50 incorporated on the handheld communication device 22.

The visual code 60 depicted on the kiosk display 30 may be configured so as to be readable by a machine (e.g., a smartphone camera), but not readable by a human. In this regard, although a human may view the visual code 60, mere viewing of the visual code 60 by a human may not allow for derivation of any associated information, such as customer identification, transaction number, diagnostic data, diagnostic summary, etc. Therefore, the use of a non-human readable visual code 60 provides some measure of privacy. Furthermore, privacy associated with the customer's transaction with the kiosk 12 may be enhanced by encrypting some or all communications to and from the kiosk 12, the sever(s) 24, 26, 28, and the smartphone 22.

In one embodiment, both the kiosk 12 and the handheld communication device 22 may be linked to operations server 28 which may operate a website accessible by the kiosk 12 and the handheld communication device 22. The operative link between the kiosk 12 and the operations server 28 allows the operations server 28 to identify which unique code 60 is being displayed on a particular kiosk 12. In this regard, the operations server 28 may be in communication with a code database having a plurality of preprogrammed codes stored therein and may send a signal including one of the preprogrammed codes to the kiosk 12 in response to a request from the kiosk 12 for a code. Alternatively, the kiosk 12 may include a local code database that may include a plurality of preprogrammed codes stored therein and may retrieve one of the preprogrammed codes in response to activation by the customer.

The scanning or capturing of the unique code 60 by the handheld communication device 22 may cause the handheld communication device 22 to send a signal to the operations server 28 identifying that handheld communication device 22 as having scanned that particular code 60. The operations server 28 may identify the particular code 60 scanned by the handheld communication device 22 as having been displayed on a particular kiosk 12. Thus, the operations server 28 is capable of creating an operative link between the handheld communication device 22 and the customer's transaction on the kiosk 12. Once the operative link is established and identified by the operations server 28, a unique identification number or other identifier may be assigned by the operations server 28 to the customer or to the specific transaction. Thus, any data, information, solutions, results, etc., associated with the customer's interaction with the kiosk 12 may be associated with the unique identifier associated with the customer to allow the customer to access such information at any time. For instance, any data or information uploaded to any one of the servers 24, 26, 28 may be associated with the unique identifier associated with the visual code 60, and any data, information or diagnosis generated at any one of the servers 24, 26, 28 and associated with the customer's interaction with the kiosk 12 may be associated with the unique identifier. In this regard, the unique identifier may allow the customer, a vehicle professional, or sales associate to later retrieve any data, information, or diagnostic summary stored on the servers 24, 26, 28 through the use of the unique identifier associated with the visual code 60.

Handheld Communication Device as User Interface

The code 60 displayed by the kiosk 12 may also be used to pair the handheld communication device 22 with the kiosk 12 to allow for direct communications between the handheld communication device 22 and the kiosk 12. In other words, at least some communications between the handheld communication device 22 and the kiosk 12 may not have to pass through an intervening server. Once the handheld communication device 22 is paired with the kiosk 12, the handheld communication device 22 may be used to retrieve and upload information to the kiosk 12 and can also be used as a display for any data, information or diagnostic results. In this regard, the handheld communication device 22 may mirror any information displayed on the kiosk 12 or supplement anything displayed by the kiosk 12.

The handheld communication device 22 may be used to gather information that may be needed to determine the specific communication protocol(s) needed to facilitate communication between the kiosk tool 16 and the vehicle 14. Those communication protocols may be derivable from vehicle identification information, such as the year, make, model, and engine of the vehicle 14, or the vehicle identification number (VIN) associated with the vehicle 14. In many vehicles 14, the vehicle identification information may be easily retrievable using the customer's handheld communication device. For instance, the camera 50 on the smartphone 22 may be used to capture vehicle identification information located on the vehicle 14. For instance, many vehicles 14 include a barcode or other code or information located in the door jamb of the vehicle 14.

In-Store Kiosk

In one embodiment, the kiosk 12 may be positioned in a vehicle parts store 25. A customer inside the store 25 may initiate an interaction with the kiosk 12 by tapping a touch screen or activating another initiation button on the kiosk 12. Upon initiation, the kiosk 12 may display a QR code 60 on the display screen 30 and the user may scan the QR code 60 with the customer's smartphone 22. Once the QR code 60 is scanned, the smartphone 22 may automatically open a website associated with the kiosk 12, either through an app on the smartphone 22, or initiated in response to scanning the QR code 60. It is also contemplated that the website may be manually entered by the customer in response to a prompt displayed on the smartphone 22 in response to scanning the QR code 60. The customer may use the smartphone 22 to enter customer information to the website to correlate the unique QR code 60 to the customer at the operations server 28. The customer information may include a unique user ID, an electronic ID associated with the smartphone 22 or other customer identifying information. The customer information may additionally include name, address, birthdate, vehicle information, etc.

The customer may retrieve the kiosk tool 16 and take the tool 16 to the customer's vehicle 14 parked in the parking lot or street. In this regard, the kiosk tool 16 may be configured to be remoted from the housing (e.g., the tool 16 may not be attached to the housing via a wire or cable). The customer may connect the tool 16 the diagnostic port 18 on the vehicle 14 and may request an electronic VIN from the vehicle 14. Upon receiving the electronic VIN, the tool 16 may determine the vehicle-specific protocol for the vehicle 14 under test, and using that vehicle-specific protocol, request diagnostic data from the vehicle 14. It is contemplated that the user's smartphone 22 may be operatively linked to the tool 16 and used as a communication resource for accessing any additional communication protocols needed from the remote communications server 26 to communicate with the vehicle 14. For more information regarding the use of the smartphone 22 for linking the tool 16 with remote diagnostic resources, please refer to U.S. Pat. No. 9,384,599 entitled Handheld Vehicle Diagnostic Tool with VIN decoder and Communication System, the contents of which are expressly incorporated herein by reference.

The vehicle 14 may communicate the diagnostic data to the tool 16, and the received diagnostic data may be temporarily stored on the tool 16. The customer may return the tool 16 to the kiosk 12 to allow the data to be transferred from the tool 16 to the kiosk 12 using short range communication resources on the tool 16 and kiosk 12, such as wired communication or wireless communication (e.g. Bluetooth®, WiFi, etc.). The kiosk 12 may upload the retrieved diagnostic data to the remote diagnostic server 24 via the Internet, or other communication pathway(s), using the transceiver on the kiosk 12. The remote diagnostic server 24 may analyze the diagnostic data and generate a diagnostic report, which may include a summary of the retrieved data (e.g., a translation of the retrieved diagnostic data), a most likely solution, repair services and repair parts associated with the most likely solution. The diagnostic summary may also include a referral for possible repair shops or technicians that can provide the associated repair services and repair parts, along with parts and labor estimates. The diagnostic summary may additionally identify required tools for any repairs, as well as a link to repair videos, and service information, possible recalls, etc. The diagnostic summary may also provide an alert on required parts or repairs, or suggested parts or repairs based on the date of the last inspection/service. In this regard, the vehicle's service history within the network of kiosks 12, and participating parts stores and repair stores may be accessible for purposes of providing such alerts. For more information regarding the analysis of diagnostic data, please refer to U.S. Pat. No. 8,370,018 entitled Vehicle Diagnostic Process, U.S. Pat. No. 9,824,507 entitled Mobile Device Based Vehicle Diagnostic System, and U.S. Patent Application Publication No. 2016/0027223 entitled Predictive Diagnostic Method and System, the contents of both which are expressly incorporated herein by reference.

The summary may be communicated to the user's smartphone 22, as well as to the kiosk 12. The summary may also be stored at the operations server 28 or diagnostic server 24 for subsequent retrieval by the smartphone 22. In this regard, the summary may be associated with the unique identifier associated with the QR code 60 previously scanned by the customer. Thus, should the customer present the QR code 60, or any other identifier associated therewith, at a later time, the summary can be retrieved and be downloaded to the smartphone 22. The diagnostic summary may identify one or more replacement parts and/or one or more repair services. An associate at the store may be able to retrieve the customer's data, information and summary from the servers 24, 26, 28 using the visual code 60, which may be stored in the memory 46 of the customer's smartphone 22 and depicted on the smartphone display 52 for scanning at the store. Once the code 60 is scanned using a scanner or camera at the store, the computer system at the store or shop may be linked to the servers 24, 26, 28 to retrieve the customer's data, information and diagnostic summary. As such, the ability to interface the customer's smartphone 22 with the kiosk 12 may provide for e-commerce opportunities for repair shops and parts stores.

Parking Lot Kiosk

It is also contemplated that the kiosk 12 may be located in a parking lot in close proximity to a parking space intended for a vehicle 14 that is to undergo diagnostic analysis. Once the vehicle 14 is parked, the customer may initiate a transaction on the kiosk 12. Upon initiation, the kiosk 12 may display the unique visual code 60, which may be scanned by the camera 50 on the customer's smartphone 22. The scanning or viewing the unique visual code 60 by the smartphone 22 may cause the smartphone 22 to send a signal including a unique identifier to the operations server 28 such that the customer's transaction with the kiosk 12 may be associated with the unique identifier. The scanning or viewing of the unique visual code 60 by the smartphone 22 may also allow the smartphone 22 to function as an input device to the operations server 28 and/or the kiosk 12. For instance, vehicle identification information may be entered manually by the user, or the corresponding smartphone app may allow the user to select vehicle identifying characteristics of the vehicle 14, such as year, make, model, engine of the vehicle 14. The smartphone 22 may also be used to capture an image of the physical VIN from the vehicle 14, scan a barcode VIN on the vehicle 14, or capture an image of the license plate. Such information may be uploaded to the operations server 28 to derive the protocols necessary for communicating with the vehicle 14. The upload of the vehicle identification information may be done directly from the smartphone 22, or alternatively, the smartphone 22 may transfer the information to the kiosk 12 via short range communication, and the kiosk 12 may relay the information to the remote operations server 28. In this regard, the smartphone 22 may be paired with the kiosk 12 via Bluetooth® or other short-range communication protocols to effectuate such information transfer.

After the vehicle identification information has been obtained, the kiosk tool 16 may be plugged into the diagnostic port on the vehicle 14, and the vehicle data may be obtained. The obtained vehicle data may be uploaded to the diagnostic server 24 for diagnostic analysis. A summary may be prepared by the diagnostic server 24, which may be communicated to the smartphone and/or the kiosk 12. Anything displayed on the kiosk 12 may also be displayed on the user's smartphone.

Other Diagnostic Systems

Although the foregoing describes the vehicle diagnostic system 10 as being a kiosk-based system, it is contemplated that other implementations of the system may not be kiosk-based. In this regard, one alternate system may be an electronic tablet-based system, wherein the kiosk is replaced with a tablet computer. In such a system, the tablet computer may display a visual code to create a unique identifier associated with the customer's interaction with the tablet computer, as well as to create an operative link between the tablet computer and the user's handheld communication device 22.

Furthermore, it is contemplated that the vehicle diagnostic system 10 may be used for automobiles, trucks, drones, electronic vehicles, autonomous vehicles. Furthermore, the diagnostic system 10 may be incorporated into V2I and V2V systems.

For more information regarding the use of a kiosk for vehicle diagnostic purposes, please refer to U.S. Pat. No. 7,734,390 entitled Use of Automotive Diagnostic Console to Diagnose Vehicle, the contents of which are expressly incorporated herein by reference.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A vehicle diagnostic method comprising:
generating a visual code on a kiosk display for scanning by a camera on a handheld communication device;
facilitating establishment of an operative connection between the kiosk and the handheld communication device in response to scanning of the visual code by the handheld communication device;
receiving, via the handheld communication device, vehicle identifying information retrieved from a vehicle under test;
sending a signal to the kiosk or to a remote server via the handheld communication device, the signal including vehicle diagnostic information and an identifier associated with the visual code;
analyzing the vehicle diagnostic information to determine a possible vehicle fix associated with the vehicle diagnostic information; and
storing the possible vehicle fix on the remote server in a manner which allows for subsequent retrieval of the possible vehicle fix from the remote server in response to receiving the identifier at the remote server.

2. The vehicle diagnostic method recited in claim 1, further comprising the step of transmitting the possible vehicle fix from the remote server to the handheld communication device.

3. The vehicle diagnostic method recited in claim 1, further comprising the steps of:
communicating the vehicle identifying information from the handheld communication device to the kiosk; and
deriving at least one vehicle communication protocol from the vehicle identifying information.

4. The vehicle diagnostic method recited in claim 1, wherein the generating step includes generating a non-human readable visual code on the kiosk display.

5. The vehicle diagnostic method recited in claim 1, wherein the generating step includes generating a QR code on the kiosk display.

6. The vehicle diagnostic method recited in claim 1, further comprising the step of encrypting the signal prior to sending the signal to the remote server.

7. The vehicle diagnostic method recited in claim 1, wherein the vehicle diagnostic information includes sensor data or diagnostic trouble codes.

8. The vehicle diagnostic method recited in claim 1, wherein the identifier is transaction specific.

9. The vehicle diagnostic method recited in claim 1, further comprising the step of communicating the identifier to the remote server via the handheld communication device.

10. The vehicle diagnostic method recited in claim 1, wherein the step of sending the signal to the remote server includes sending the signal from the kiosk to the remote server via the Internet.

11. The vehicle diagnostic method recited in claim 1, wherein the step of sending the signal to the remote server includes sending the signal from the kiosk to the remote server via the handheld communication device.

12. A vehicle diagnostic system for use with a handheld communication device, the vehicle diagnostic system comprising:
    a kiosk having:
        a housing;
        a transceiver disposed within the housing and configured to communicate with the handheld communication device;
        a processor disposed within the housing and capable of generating a signal including an associated visual code;
        a display associated with the housing and in communication with the processor to receive the signal, the display being configured to depict the visual code thereon in response to receipt of the signal, the visual code being readable by the handheld communication device and being associated with instructions for configuring the handheld communication device to communicate with the transceiver; and
        a diagnostic tool in communication with the housing and communicable with a vehicle to retrieve data therefrom; and
    computer executable instructions downloadable onto the handheld communication device for configuring the handheld communication device to:
        read the visual code depicted on the display; and
        establish communication between the handheld communication device and the kiosk to facilitate data transfer between the handheld communication device and the kiosk; and
        display diagnostic information associated with the data retrieved by the diagnostic tool.

13. The vehicle diagnostic system recited in claim 12, wherein the computer executable instructions further configure the handheld communication device to identify a kiosk communication characteristic associated with the visual code in response to receipt of the visual code.

14. The vehicle diagnostic system recited in claim 13, wherein the kiosk communication characteristic is a communication protocol.

15. The vehicle diagnostic system recited in claim 13, wherein the kiosk communication characteristic is a communication address.

16. The vehicle diagnostic system recited in claim 12, wherein the computer executable instructions further configure the handheld communication device to display a prompt to a user to enter vehicle identification information into the handheld communication device.

17. The vehicle diagnostic system recited in claim 12, wherein the computer executable instructions further configure the handheld communication device to utilize an onboard camera to optically obtain vehicle identification information from a vehicle.

18. The vehicle diagnostic system recited in claim 12, wherein the diagnostic information includes diagnostic trouble codes.

19. The vehicle diagnostic system recited in claim 12, wherein the diagnostic information includes a diagnostic solution associated with the retrieved data.

20. The vehicle diagnostic system recited in claim 12, wherein the computer executable instructions further configure the handheld communication device to depict content simultaneously depicted on the display of the kiosk.

21. The vehicle diagnostic system recited in claim 12, wherein the kiosk display is configured to display information associated with the data retrieved by the diagnostic tool.

22. The vehicle diagnostic system recited in claim 12, wherein the handheld communication device display is configured to display information associated with the data retrieved by the diagnostic tool.

23. The vehicle diagnostic system recited in claim 12, wherein the visual code is a QR code.

24. The vehicle diagnostic system recited in claim 12, wherein the diagnostic tool is connected to the housing and is connectable with the vehicle.

25. The vehicle diagnostic system recited in claim 12, wherein the computer executable instructions further configure the handheld communication device to establish communication between the handheld communication device and the kiosk in response to reading the visual code.

26. A vehicle diagnostic system for use with a handheld communication device, the vehicle diagnostic system comprising:
    a kiosk having:
        a housing;
        a transceiver disposed within the housing and configured to communicate with the handheld communication device;
        a processor disposed within the housing and capable of generating a signal including an associated visual code;
        a display associated with the housing and in communication with the processor to receive the signal, the display being configured to depict the visual code thereon in response to receipt of the signal, the visual code being readable by the handheld communication device and being associated with instructions for configuring the handheld communication device to communicate with the transceiver; and
        a diagnostic tool in communication with the housing and communicable with a vehicle to retrieve data therefrom; and
    computer executable instructions downloadable onto the handheld communication device for configuring the handheld communication device to:
        read the visual code depicted on the display;
        establish communication between the handheld communication device and the kiosk to facilitate data transfer between the handheld communication device and the kiosk; and
        display a prompt to a user to enter vehicle identification information into the handheld communication device.

27. A vehicle diagnostic system for use with a handheld communication device, the vehicle diagnostic system comprising:
    a kiosk having:
        a housing;

a transceiver disposed within the housing and configured to communicate with the handheld communication device;

a processor disposed within the housing and capable of generating a signal including an associated visual code;

a display associated with the housing and in communication with the processor to receive the signal, the display being configured to depict the visual code thereon in response to receipt of the signal, the visual code being readable by the handheld communication device and being associated with instructions for configuring the handheld communication device to communicate with the transceiver; and a diagnostic tool in communication with the housing and communicable with a vehicle to retrieve data therefrom; and computer executable instructions downloadable onto the handheld communication device for configuring the handheld communication device to:

read the visual code depicted on the display;

establish communication between the handheld communication device and the kiosk to facilitate data transfer between the handheld communication device and the kiosk; and utilize an onboard camera to optically obtain vehicle identification information from a vehicle.

\* \* \* \* \*